United States Patent
Choi et al.

(10) Patent No.: US 8,948,913 B2
(45) Date of Patent: Feb. 3, 2015

(54) METHOD AND APPARATUS FOR NAVIGATING ROBOT

(75) Inventors: Sunglok Choi, Daejeon (KR); Jae-Yeong Lee, Daejeon (KR); Wonpil Yu, Daejeon (KR)

(73) Assignees: Electronics and Telecommunications Research Institute, Daejeon (KR); SK Telecom Co., Ltd., Seoul (KR)

( * ) Notice: Subject to any disclaimer, the term of this patent is extended or adjusted under 35 U.S.C. 154(b) by 880 days.

(21) Appl. No.: 12/911,298

(22) Filed: Oct. 25, 2010

(65) Prior Publication Data

US 2011/0098874 A1    Apr. 28, 2011

(30) Foreign Application Priority Data

Oct. 26, 2009  (KR) .................. 10-2009-0101671
Oct. 20, 2010  (KR) .................. 10-2010-0102604

(51) Int. Cl.
  *G06F 19/00*    (2011.01)
  *B25J 9/16*     (2006.01)
  *G05D 1/02*     (2006.01)

(52) U.S. Cl.
  CPC ............. *B25J 9/1664* (2013.01); *G05D 1/0212* (2013.01); *G05D 1/0238* (2013.01); *G05B 2219/40506* (2013.01)
  USPC ........... 700/245; 700/253; 700/255; 700/258; 701/26; 318/568.12; 318/568.16; 318/568.19; 340/435

(58) Field of Classification Search
  USPC ......... 701/26; 901/1; 700/245, 253, 255, 258; 318/568.12, 568.16, 568.19; 340/435
  See application file for complete search history.

(56) References Cited

U.S. PATENT DOCUMENTS

| | | | |
|---|---|---|---|
| 5,111,401 A | 5/1992 | Everett, Jr. et al. | |
| 5,937,398 A * | 8/1999 | Maeda | 706/32 |
| 7,587,260 B2 | 9/2009 | Bruemmer et al. | |
| 7,765,499 B2 * | 7/2010 | De Graeve et al. | 706/20 |
| 8,339,417 B2 * | 12/2012 | Stroila et al. | 345/629 |
| 2003/0058238 A1 * | 3/2003 | Doak et al. | 345/419 |
| 2006/0237037 A1 | 10/2006 | Kim | |
| 2008/0071423 A1 | 3/2008 | Murray, IV et al. | |
| 2010/0274430 A1 * | 10/2010 | Dolgov et al. | 701/25 |

FOREIGN PATENT DOCUMENTS

| | | |
|---|---|---|
| JP | 2009-178782 | 8/2009 |
| JP | 2009-217330 | 9/2009 |

(Continued)

OTHER PUBLICATIONS

Suhyeon et al., Autonomous SLAM Technique with Stereo Vision, Proceedings of the 27th Chinese Control Conference Jul. 16-18, 2008, Kunming,Yunnan, China, pp. 330-335.*

(Continued)

*Primary Examiner* — Khoi Tran
*Assistant Examiner* — Jaime Figueroa
(74) *Attorney, Agent, or Firm* — Staas & Halsey LLP

(57) ABSTRACT

A method of navigating a robot includes creating a robot navigation map using a map database required for navigation of the robot; and creating a path on which no obstacle is located in the map database using the created robot navigation map. Further, the method of navigating the robot includes primarily controlling the robot so that the robot travels along the created path; and secondarily controlling the robot so that the robot avoids an obstacle on the path.

20 Claims, 7 Drawing Sheets

(56) References Cited

FOREIGN PATENT DOCUMENTS

| KR | 10-0638219 | 10/2006 |
|----|------------|---------|
| KR | 10-2009-0039136 | 4/2009 |

OTHER PUBLICATIONS

Kim et al., Autonomous SLAM technique by integrating Grid and Topology map, International Conference on Smart Manufacturing Application Apr. 9-11, 2008 in KINTEX, Gyeonggi-do, Korea , pp. 413-418.*

Kim et al., Increasing SLAM Performance by Integrating Grid and Topology Map, Journal of Computers, vol. 4, No. 7, Jul. 2009, pp. 601-609.*

Guivant et al., Navigation and Mapping in Large Unstructured Environments, 2004, Sage Publications, The International Journal of Robotics Research, vol. 23, No. 4-5, pp. 449-472.*

Pfingsthorn et al., A Scalable Hybrid Multi-Robot SLAM Method for Highly Detailed Maps, 2008, Springer Link, RoboCup 2007: Robot Soccer World Cup XI Lecture Notes in Computer Science, vol. 5001, pp. 457-464.*

Yamauchi et al., Mobile Robot Exploration and Map-Building with Continuous Localization, 1998, IEEE Proceedings of the International Conference on Robotics & Automation, Leuven, Belgium, pp. 3715-3720.*

Burgard et al., Estimating the absolute position of a mobile robot using position probability grids, Aug. 1996, AAAI' 96 Proceedings of the thirteenth national conference on Artificial intelligence—vol. 2, pp. 896-901.*

Sunglok Choi et al., "uRON: A Reconfigurable Robot Navigation Framework" (w/ English abstract), The $5^{th}$ Korea Robotics Society Annual Conference, Jul. 1-3, 2010.

Sunglok Choi et al., "uRON v1.5: A Device-Independent and Reconfigurable Robot Navigation Library", IEEE Workshop on Advanced Robotics and Its Social Impacts (IEEE ARSO), Oct. 26, 2010, Seoul, Korea.

* cited by examiner

METHOD AND APPARATUS FOR NAVIGATING ROBOT

CROSS-REFERENCE TO RELATED APPLICATION(S)

The present invention claims priority of Korean Patent Application No. 10-2009-0101671, filed on Oct. 26, 2009, and Korean Patent Application No. 10-2010-0102604, filed on Oct. 20, 2010, which are incorporated herein by references.

FIELD OF THE INVENTION

The present invention relates to robot navigation technology related to map creation, path planning, path tracking, and obstacle avoidance; and, more particularly, to a method and apparatus for navigating a robot which are capable of reconfiguring (e.g., modifying, replacing, newly creating or the like) detailed functionalities required for the navigation of a robot.

BACKGROUND OF THE INVENTION

For robots to execute tasks related to movement, such as cleaning, guidance, crime prevention and the conveyance of loads, a navigation functionality for planning paths from a start point to a destination point and controlling the robots so that they can travel along the paths without causing a collision is required. Currently, robot companies have continuously researched navigation technologies which are suitable for the robots they develop.

However, it is difficult for the robot navigation technologies to be applied to robots manufactured by other robot manufacturing companies and also difficult to modify detailed navigation functionalities because they are designed to be suitable only for the robots of the corresponding robot companies.

Furthermore, technologies related to robot navigation frameworks, e.g., autonomous robot navigation technologies, technologies of location awareness on a layered map, path planning technologies and path tracking technologies and the like have been proposed. However, these technologies do not take into consideration the independence of hardware and a reconfiguration structure. Although some of the proposed technologies take into consideration a structure independent of the hardware used in the robot, they have the disadvantage of not taking into consideration the reconfiguration of detailed navigation functionalities.

SUMMARY OF THE INVENTION

In view of the above, the present invention provides a robot navigation technology which is capable of implementing components required for the navigation of a robot independently of hardware and which is capable of reconfiguring (e.g., modifying, replacing, newly creating or the like) them.

In accordance with a first aspect of the present invention, there is provided a method of navigating a robot, including: creating a robot navigation map using a map database required for navigation of the robot; creating a path on which no obstacle is located in the map database using the created robot navigation map; primarily controlling the robot so that the robot travels along the created path; and secondarily controlling the robot so that the robot avoids an obstacle on the path.

In accordance with a second aspect of the present invention, there is provided An apparatus for navigating a robot, including: a sensor unit for generating a sensor signal based on operation of the robot; a navigation control unit for calculating a target control velocity for the robot using the sensor signal of the sensor unit, status information of the robot, and/or a command signal of a user terminal; and a robot drive unit for driving the robot in accordance with the target control velocity calculated by the navigation control unit.

In accordance with an embodiment of the present invention, it is possible to easily apply to a variety of types of robots manufactured by various robot companies because components required for the navigation of the robot can be implemented independently of hardware. Furthermore, it is also possible to easily apply to various uses, e.g., cleaning, guidance, crime prevention, the conveyance of loads and the like because it is possible to reconfigure (e.g., modify, replace, newly create or the like) the basic detailed navigation functionalities that have been given.

BRIEF DESCRIPTION OF THE DRAWINGS

The objects and features of the present invention will become apparent from the following description of embodiments given in conjunction with the accompanying drawings, in which.

DETAILED DESCRIPTION OF THE PREFERRED EMBODIMENTS

The present invention proposes a robot navigation framework in which various components required for the navigation of a robot are classified, the interfaces thereof are defined, and therefore component categories can be reconfigured. The categories of components required for the navigation of a robot may be classified into, e.g., the three categories of a map category, a task category, and a device category. The following description of embodiments will focus on the task category.

Hereinafter, embodiments of the present invention will be described in detail with reference to the accompanying drawings which form a part hereof.

Figure 1:
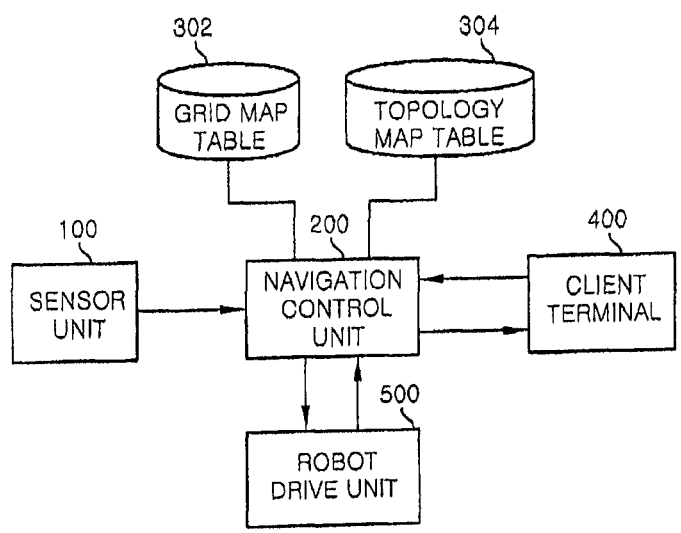
FIG. 1 is a schematic block diagram of an apparatus for navigating a robot in accordance with an embodiment of the present invention.

FIG. 1 is a schematic block diagram of an apparatus for navigating a robot in accordance with an embodiment of the present invention, which includes a sensor unit 100, a navigation control unit 200, a grid map table 302, a topology map table 304, a client terminal 400, and a robot drive unit 500.

As shown in FIG. 1, the sensor unit 100 functions to apply sensor signals based on the operation of the robot (not shown) to the navigation control unit 200.

Figure 2:
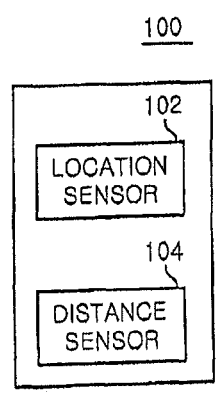
FIG. 2 is a block diagram showing the detailed configuration of the sensor unit shown in FIG. 1.

The sensor unit 100, as shown in FIG. 2, includes a location sensor 102 and a distance sensor 104.

The location sensor 102 of FIG. 2 measures the location information of the robot, e.g., information about the location and direction angle of the robot and odometer data, and sends the measured location information of the robot to the navigation control unit 200.

The distance sensor 104 measures information about the distance which the robot is away from an obstacle, and sends the measured information about the distance to the navigation control unit 200.

Referring back to FIG. 1, the navigation control unit 200 functions to calculate the target control velocity of the robot using a sensor signal received from the sensor unit 100, e.g., location information and/or distance information, a user command signal or a set signal applied from the client terminal 400 (which will be described later), and robot status information received from the robot drive unit 500, in accordance with the embodiment of the present invention. The "target control velocity" refers to information which is used to reconfigure (e.g., modify, replace, newly create, or the like) detailed functionalities required for the navigation of the robot using the above-described sensor signal, command signal (or set signal), and robot status information in accordance with the embodiment of the present invention.

The target control velocity calculated by the navigation control unit 200 as described above is provided to the robot drive unit 500 as a robot commanding signal.

Furthermore, the navigation control unit 200 manages map creation information (grid map creation information or topology map creation information) and map data (grid map data or topology map data) in the grid map table 302 and the topology map table 304, and creates a callback signal based on the results of monitoring the robot status information of the robot drive unit 500 to provide the created callback signal to the client terminal 400. Here, the callback signal includes, e.g., signals indicating the termination of the execution of a command by the robot and an error in the execution of a command by the robot.

Figure 3A:
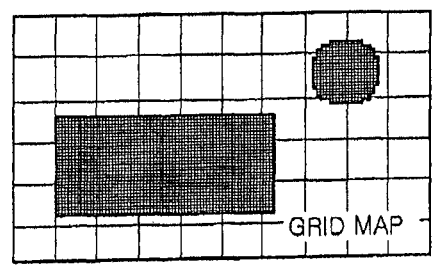
FIGS. 3A and 3B are diagrams showing examples of a grid map and a topology map stored in the grid map table and a topology map table shown in FIG. 1, respectively.

A grid map required for the navigation of the robot is stored in the grid map table 302 in compliance with the commands of the navigation control unit 200. Such a grid map, as shown in FIG. 3A, is configured to divide a space into small cells, as in graph paper, and to represent the space using the status of occupation of each cell, and may be considered to be similar to a bitmap used in computer graphics.

Figure 3B:
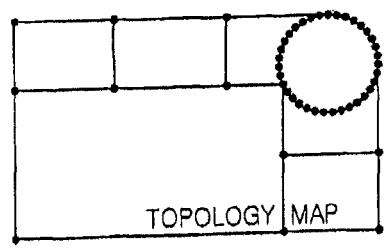

A topology map required for the navigation of the robot is stored in the topology map table 304 in compliance with the navigation control unit 200. Such a topology map, as shown in FIG. 3B, represents the relationship of connections in space using a graphic data structure including nodes and edges. For example, a road network map in which roads are represented by edges and the junctions between roads are represented by nodes is a representative example of the topology map.

The client terminal 400 is a unit for inputting a user command signal or a set signal required for the driving of the robot. The user command signal or set signal inputted using the client terminal 400 is applied to the navigation control unit 200. Furthermore, the client terminal 400 receives a callback signal, e.g., a signal indicating the termination of the execution of a command by the robot or indicating an error in the execution of a command by the robot, from the navigation control unit 200.

Figure 4:
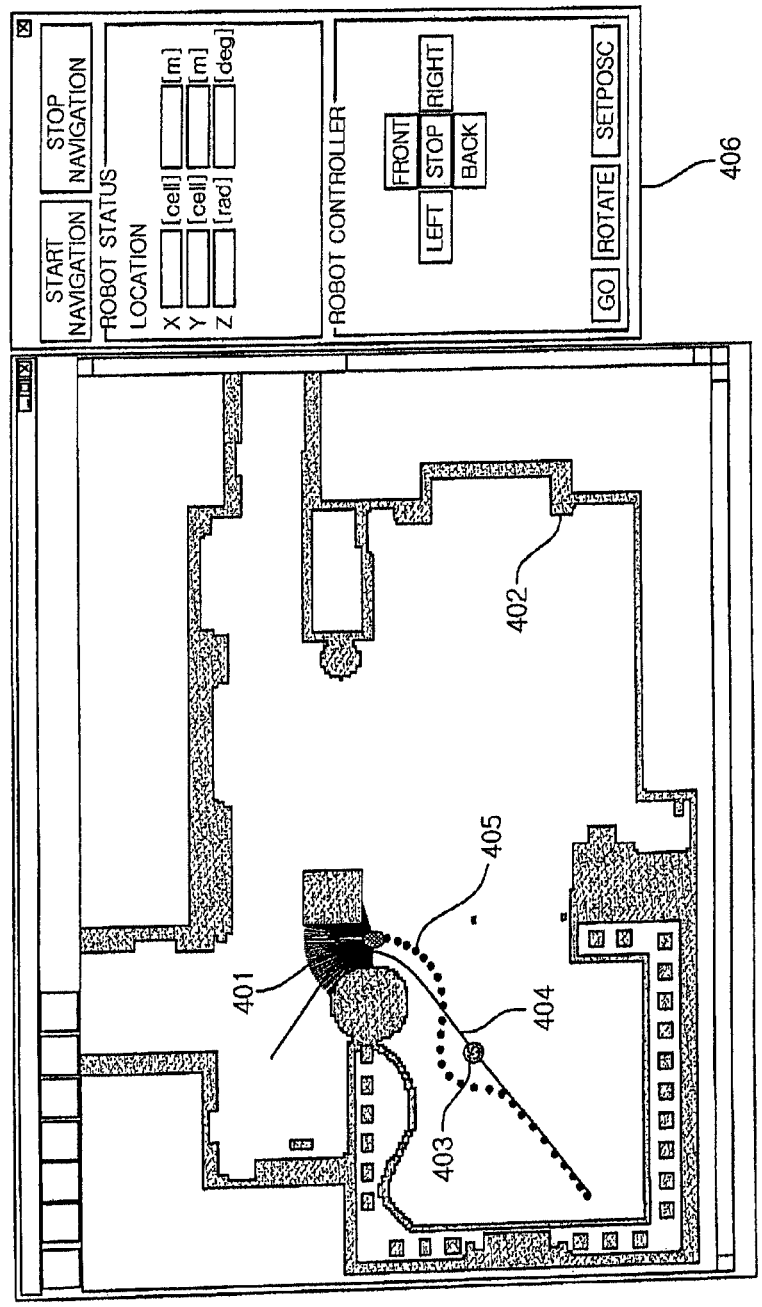
FIG. 4 is a diagram showing an example of the application of the client terminal shown in FIG. 1.

FIG. 4 shows an example of the application of the client terminal 400, which includes a moving robot 401, a map 402, an obstacle 403 not present in the map, a path 404 created by the navigation control unit 200, a projector 405 along the moving robot 401 has actually traveled, and a user control terminal 406.

The robot drive unit 500 functions to drive the robot in accordance with the robot commanding signal, e.g., target control velocity, of the navigation control unit 200. Resultantly, the corresponding robot can be driven.

Figure 5:
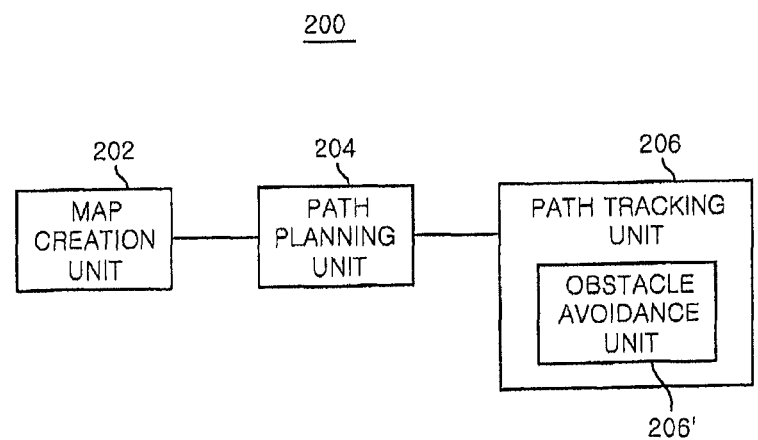
FIG. 5 is a diagram illustrating the detailed configuration of the navigation control unit shown in FIG. 1.

Further, FIG. 5 is a diagram showing the detailed configuration of the navigation control unit 200 shown in FIG. 1, which manages task categories required for the implementation of the navigation of the robot in accordance with the embodiment of the present invention.

As shown in FIG. 5, the navigation control unit 200 includes a map creation unit 202, a path planning unit 204 and a path tracking unit 206.

Here, the map creation unit 202 performs to create maps required for the navigation of the robot, e.g., a grid map and a topology map using the sensor signal of the sensor unit 100, e.g., the location information of the location sensor 102 or the distance information of the distance sensor 104. The map creation unit 202 updates the probability of occupation of each cell of the grid map in the grid map table 302 using information about the location of the robot and information about a sensed obstacle as inputs.

The path planning unit 204 performs to create a path from a start point to a destination point along which the robot can travel without causing a collision using the grid map and topology map created by the map creation unit 202. The created path is represented by continuous points in space. The path planning unit 204 uses the grid map and the topology map, and includes map reading functions suitable for respective maps.

The path tracking unit 206 performs to control the robot so that the robot can travel along the path created by the path planning unit 204. The path tracking unit 206, as described above, reads a set of continuous points representing a path created by the path planning unit 204 and a path given for the current status (location, direction angle, velocity and the like) of the robot, and calculates the target control velocity of the robot at which the robot can travel along the path.

In this case, the path tracking unit 206 further includes an obstacle avoidance unit 206'. The obstacle avoidance unit 206' performs to calculate the robot control velocity which enables the robot to avoid an obstacle which is not present on the grid map and the topology map. For example, the obstacle avoidance unit 206' calculates the control velocity at which the robot can travel to a given destination point without colliding with an obstacle based on the current status (location, direction angle, velocity, target direction and the like) of the robot and distance information.

In conjunction with the above-described configuration, an example of a method of navigating a robot in accordance with an embodiment of the present invention will be described below with reference to the flow chart of FIG. 6.

Figure 6:
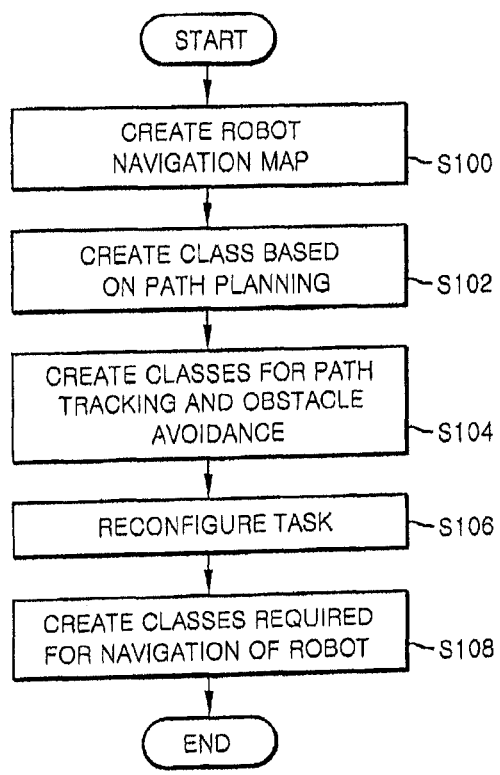
FIG. 6 is a flow chart illustrating a method of navigating a robot in accordance with an embodiment of the present invention.

As shown in FIG. 6, the navigation control unit 200 creates map information required for the navigation of the robot using sensor information, e.g., location information or distance information, received from the sensor unit 100 in step S100. Here, the map information includes a grid map and a topology map, and the grid map and the topology map are stored in the grid map table 302 and the topology map table 304, respectively.

Thereafter, the navigation control unit 200 creates a class based on a path plan, e.g., a path along which the robot can travel without causing a collision using the grid map and the topology map, using the path planning unit 204 in step S102.

Furthermore, the navigation control unit 200 creates a class for path estimation, e.g., control information which is used to control the robot so that the robot can travel along the path created by the path planning unit 204, using the path tracking unit 206, and creates a class for obstacle avoidance, e.g., control information which is used to avoid an obstacle which is not present on the grid map and the topology map, using the obstacle avoidance unit 206' in step S104.

Once the class based on the path plan, the class for path estimation and the class for obstacle avoidance have been created, the navigation control unit 200 reconfigures a task in step S106, and apply classes required for the navigation of the robot based on the reconfiguration to the robot drive unit 500 in step S108.

Figure 7:
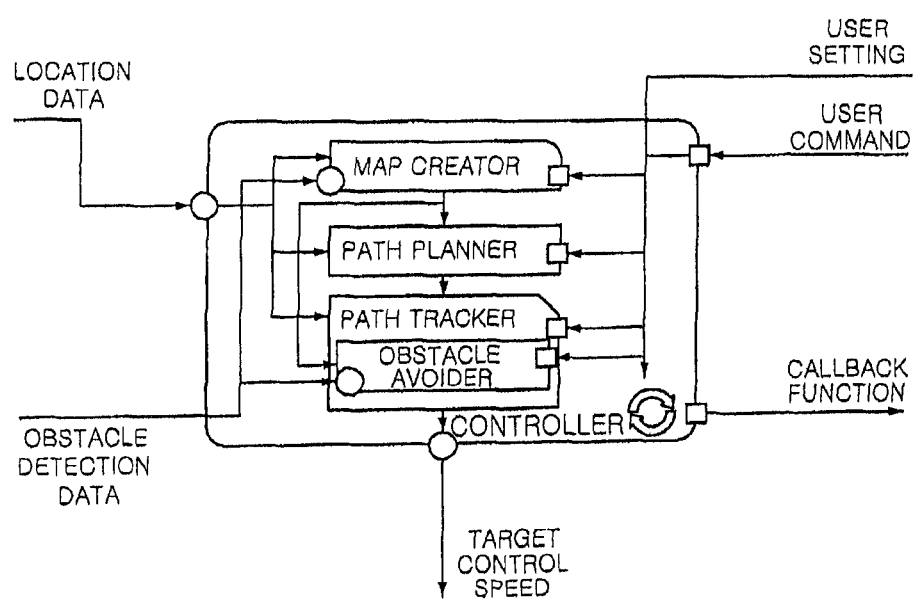
FIG. 7 is a diagram showing an example of the actual application of the apparatus for navigating a robot in accordance with the embodiment of the present invention, for example, uRON.

FIG. 7 shows an example of the actual application of the apparatus for navigating a robot in accordance with the embodiment of the present invention, which is referred to as the "uRON" hereinafter. The uRON includes a map creator, a path planner, a path tracker, an obstacle avoider (i.e., an obstacle avoidance module), and a controller, like the navigation control unit 200.

The map creator of the uRON uses the location of the robot and obstacle detection data as inputs, and includes a Set-RangeData function for updating a map currently given.

The controller of the uRON, when obstacle detection data is input, calls the SetRangeData function of the map creator and causes a current environment to be periodically incorporated into the map.

The path planner of the uRON receives a map, created by the map creator of the uRON or a user, using a LoadMap function. The path planner of the uRON uses the current and target locations of the robot as inputs, and includes a GeneratePath function for creating a path along which the robot can travel to a target location without causing a collision with an obstacle on a map. A path is represented by a set of points on a map, and is represented by an empty set when a path is not present due to an obstacle.

The controller of the uRON, when the user command to travel is issued or a service requiring traveling is requested, calls a GeneratePath function to search for a path along which the robot can travel.

The path tracker of the uRON receives a path, found by the path creator of the uRON, through a LoadPath function. The path tracker of the uRON uses the location, direction angle and velocity of the robot as inputs, and includes a FollowPath function for calculating target control velocity at which the robot will travels along an input path. The target control velocity is represented by a polar coordinate system, i.e., linear velocity and angular velocity. The controller of the uRON, when the robot travels to the target location, periodically executes the path tracker of the uRON and transfers the calculated target control velocity to the robot drive unit 500, thereby navigating the robot.

The obstacle avoider of the uRON receives obstacle detection data using a SetRangeData function. The obstacle avoider of the uRON uses the location, direction angle, velocity, target control velocity and target location of the robot as inputs, and includes an AvoidPath function for avoiding an obstacle and calculating target control velocity at which the robot will travel to the target location. The obstacle avoider of the uRON has the same output as the path tracker of the uRON. The uRON is configured such that the obstacle avoiders of the uRON are included in the path tracker, and an obstacle avoider to be used can be selected using the SetObstacleAvoider function of the path tracker of the uRON. When the controller of the uRON executes the path tracker, the obstacle avoider is executed along with the path tracker.

The controller of the uRON is executed periodically, and executes the functions of four detailed modules in compliance with a user command. For example, when the user issues a command to travel to the location (10m, 18m) on the map, the controller of the uRON uses the current location of the robot and a location given by the user as inputs, calls the GeneratePath function of the path planner, and creates a path to the target location. The controller of the uRON inputs the created path using the LoadPath function of the path tracker, periodically calls a FollowPath function, calculates target control velocity at which the robot will travel along the path, and transfers the calculated target control velocity to the robot drive unit 500. The controller of the uRON has navigation states, such as STATE_IDLE, STATE_STOP, STATE_PATH_PLAN, STATE_PATH_FOLLOW, and STATE_OBSTACLE_AVOID, and the transition between states is implemented using a Finite State Machine (FSM).

The controller of the uRON includes SetMapBuilder, SetPathPlanner and SetPathFollower functions. Accordingly, the four modules to be used for autonomous navigation can be selected using four functions, including the SetObstacleAvoider function of the path tracker of the uRON. A newly created module, including the essential functions (for example, in the case of the path tracker, a LoadMap function and a GeneratePath function) of the above individual modules, can be immediately used for the navigation of the robot using the setting functions. Using the above-described setting functions, the user can easily and rapidly replace a variety of navigation modules.

When each of the implemented detailed modules of the uRON is modified, the user can modify the module by adding only codes requiring modification to the module, rather than creating all of the codes of the module again. This can be implemented using the inheritance and overloading features of the object-oriented programming language. Furthermore, new extended detailed modules, including the implemented detailed modules, can be created.

Figure 8:
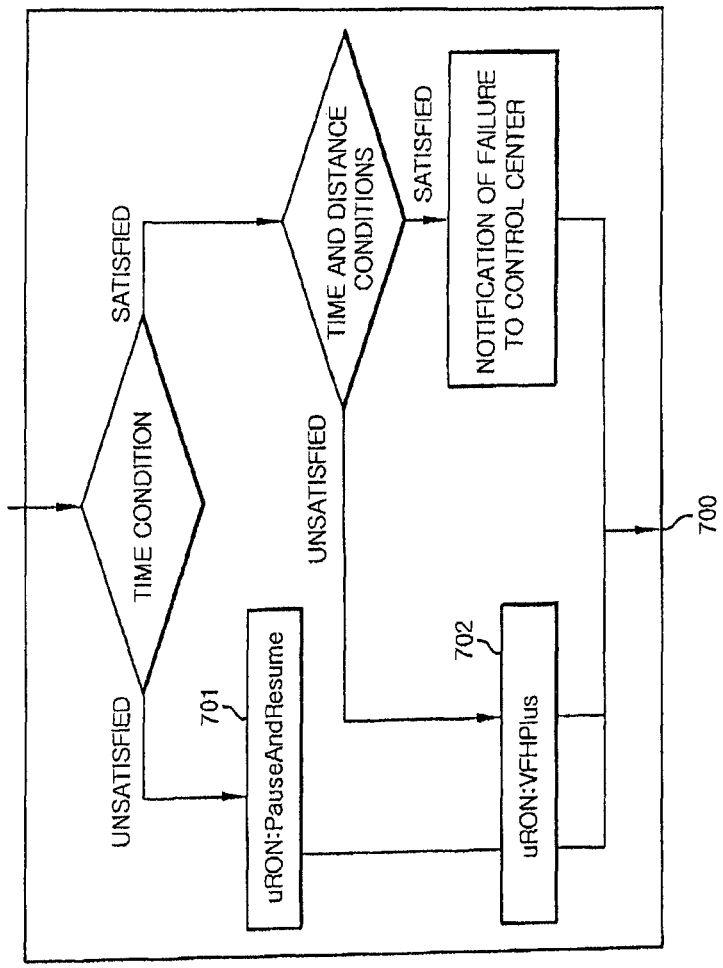
FIG. 8 is a flow chart showing the obstacle avoidance process of the uRON shown in FIG. 7.

FIG. 8 shows an example in which a new obstacle avoider 700 is created using two obstacle avoiders 701 and 702, the obstacle avoider being included in the uRON of FIG. 7.

The obstacle avoider 701 (i.e., uRON::PauseAndResume) is a module which enables stopping when an obstacle appears and enables traveling when an obstacle disappears.

The obstacle avoider 702 (i.e., uRON::VFHPlus) is a module which enables avoidance using the VFH+ technique when an obstacle is present.

A robot using the uRON can conduct the following obstacle avoidance requirements.

Requirement 1) When an obstacle is present on a path, the robot waits for a predetermined period of time. When the obstacle is still present after the predetermined period of time, the robot conducts the requirement 2.

Requirement 2) The robot starts to avoid the obstacle. When the robot has failed to avoid the obstacle, the robot conducts the requirement 3.

Requirement 3) The robot stops avoiding the obstacle, the robot notifies a remote control center of the failure of the avoidance of the obstacle.

The two obstacle avoidance modules 701 and 702 do not satisfy the above-described navigation requirements. However, the new obstacle avoider 700 capable of performing complicated functionality can be created by connecting the two modules to each other using the inheritance feature, as shown in FIG. 8. The failure of the avoidance of an obstacle is defined as not having traveled a predetermined distance for a predetermined period of time. Only the implementation of conditional statements by the user is enough.

As described above, the embodiments of the present invention are implemented to reconfigure (e.g., modify, replace, newly create or the like) detailed functionalities required for the navigation of the robot in robot navigation technology related to map creation, path planning, path tracking and obstacle avoidance.

While the invention has been shown and described with respect to the embodiments, it will be understood by those skilled in the art that various changes and modifications may be made without departing from the scope of the invention as defined in the following claims.

What is claimed is:

1. A method of navigating a robot, comprising:
   creating a robot navigation map using a map database required for navigation of the robot;
   determining a path on which no obstacle is located in the map database using the created robot navigation map; and
   controlling the robot so that the robot travels along the path avoiding an obstacle which is not stored in the map database,
   wherein said controlling includes:
      stopping, when the robot arrives at a location point where the obstacle is present during said traveling, the robot for a predetermined period of time;
      moving, if the obstacle moves out from the location point within the predetermined period of time, the robot along the path; and
      moving, if the obstacle remains on the location point after the predetermined period of time elapses, the robot to deviate from the path to avoid the obstacle.

2. The method of claim 1, wherein the robot navigation map includes a grid map and a topology map.

3. The method of claim 1, wherein the creating the robot navigation map is performed by using information about a location of the robot and information about a sensed obstacle as inputs.

4. The method of claim 1, wherein the creating the path includes outputting a set of continuous points representing the path by using a start point and a destination point as inputs.

5. The method of claim 1, wherein the controlling the robot includes outputting a target control velocity for the robot by using a set of continuous points representing the path, and a location, a direction angle and a velocity of the robot as inputs.

6. The method of claim 1, wherein the avoidinq the obstacle includes outputting a target control velocity for the robot by using a location, a direction angle, velocity and a traveling direction of the robot as inputs.

7. An apparatus for navigating a robot, comprising:
   a sensor unit for generating a sensor signal based on operation of the robot;
   a navigation control unit for calculating a target control velocity for the robot using the sensor signal of the sensor unit, status information of the robot, and/or a command signal of a user terminal; and
   a robot drive unit for driving the robot in accordance with the target control velocity calculated by the navigation control unit,
   wherein the navigation control unit includes:
      a map creation unit for creating the map information for the navigation of the robot using the sensor signal received from the sensor unit;
      a path planning unit for determining a path along which the robot travels from a start point to a destination point without causing a collision using the map information created by the map creation unit; and
      a path tracking unit for controlling the robot so that the robot travels along the path determined by the path planning unit,
   wherein the path tracking unit includes an obstacle avoidance unit configured to control the robot to avoid an obstacle which is not stored in the map information, and
   wherein the obstacle avoidance unit is configured:
      to stop, when the robot arrives at a location point where the obstacle is present during said traveling, the robot for a predetermined period of time;
      to move, if the obstacle moves out from the location point within the predetermined period of time, the robot along the path; and
      to move, if the obstacle remains on the location point after the predetermined period of time elapses, the robot to deviate from the path to avoid the obstacle.

8. The apparatus of claim 7, wherein the target control velocity is information which is used to reconfigure functionality required for navigation of the robot.

9. The apparatus of claim 7, wherein the sensor unit includes:
   a location sensor for measuring information about a location of the robot and providing the sensed information about the location of the robot to the navigation control unit; and
   a distance sensor for measuring information about a distance the robot is away from an obstacle and providing the sensed information about the distance to the navigation control unit.

10. The apparatus of claim 9, wherein the information about the location comprises information about a location of the robot, information about a direction angle of the robot, and/or odometer data.

11. The apparatus of claim 7, wherein the navigation control unit provides a callback signal based on a result of monitoring the status information of the robot to the user terminal.

12. The apparatus of claim 11, wherein the callback signal is a signal indicating termination of execution of a command by the robot or indicating an error in execution of a command by the robot.

13. The apparatus of claim 7, wherein the map information comprises grid map information and topology map information.

14. The apparatus of claim 7, wherein the path created using the path planning unit is represented by a set of continuous points in space by using the start point and the destination point as inputs.

15. The apparatus of claim 7, wherein the path tracking unit outputs a target control velocity for the robot by using a set of continuous points representing the path, and a location, direction angle and velocity of the robot as inputs.

16. The apparatus of claim 7, wherein the obstacle avoidance unit is configured to output a target control velocity for the robot by using a location, direction angle, velocity and traveling direction of the robot as inputs.

17. The apparatus of claim 7, wherein the apparatus for navigating the robot is configured to modify, replace and newly create the functionalities of the map creation unit, the path planning unit, the path tracking unit and the obstacle avoidance unit.

18. The apparatus of claim 17, wherein the modification includes recreating part of the functionalities of the map creation unit, the path planning unit, the path tracking unit, and the obstacle avoidance unit which require modification.

19. The method of claim 1, wherein said controlling further includes stopping, when the robot fails to avoid the obstacle, avoiding the obstacle and notifying a remote control center of the failure of the avoidance of the obstacle.

20. The apparatus of claim 7, wherein the obstacle avoidance unit is configured to stop, when the robot fails to avoid the obstacle, avoiding the obstacle, and to notify a remote control center of the failure of the avoidance of the obstacle.

* * * * *